H. A. UNDERWOOD.
HAND CIRCULAR SAW.
APPLICATION FILED MAY 6, 1910.

967,087.

Patented Aug. 9, 1910.

Witnesses
W. G. McMillan
E. P. Hall.

Inventor
H. A. Underwood
by Ridout & Maybee
attys

UNITED STATES PATENT OFFICE.

HENRY ARTHUR UNDERWOOD, OF HALKIRK, ALBERTA, CANADA.

HAND CIRCULAR SAW.

967,087. Specification of Letters Patent. Patented Aug. 9, 1910.

Application filed May 6, 1910. Serial No. 559,741.

*To all whom it may concern:*

Be it known that I, HENRY A. UNDERWOOD, of Halkirk, in the Province of Alberta, Canada, have invented certain new and useful Improvements in Hand Circular Saws, of which the following is a specification.

This invention relates to portable circular saws adapted to be operated by hand and my object is to devise a simple and cheap construction of saw which may be clamped to any table or bench and which may be adjusted as to its drive to suit the convenience of the user.

I attain my object by the constructions hereinafter described and illustrated in the accompanying drawings, in which—

Figure 1:
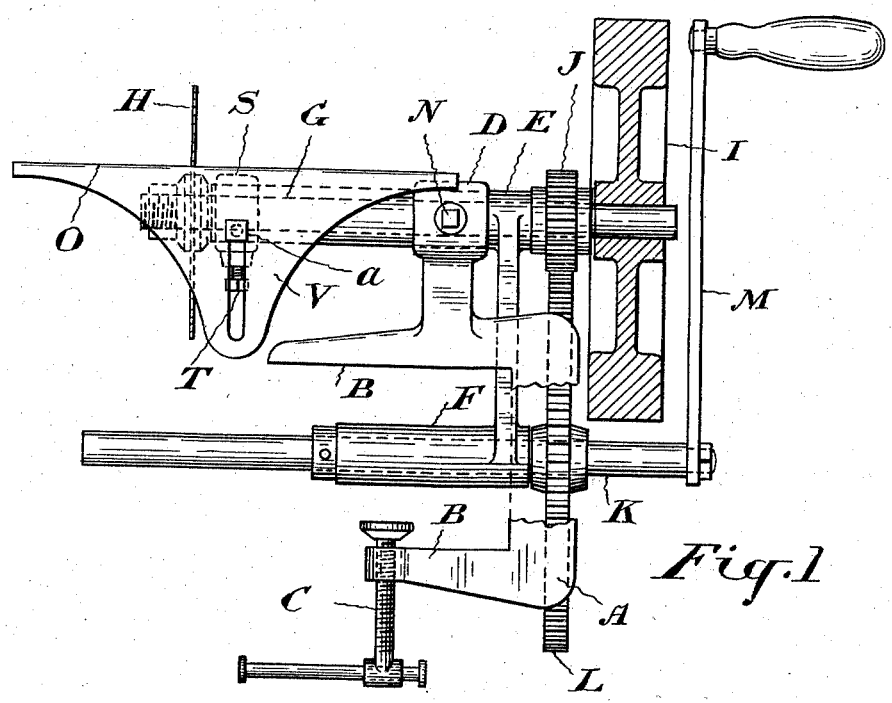
Figure 2:
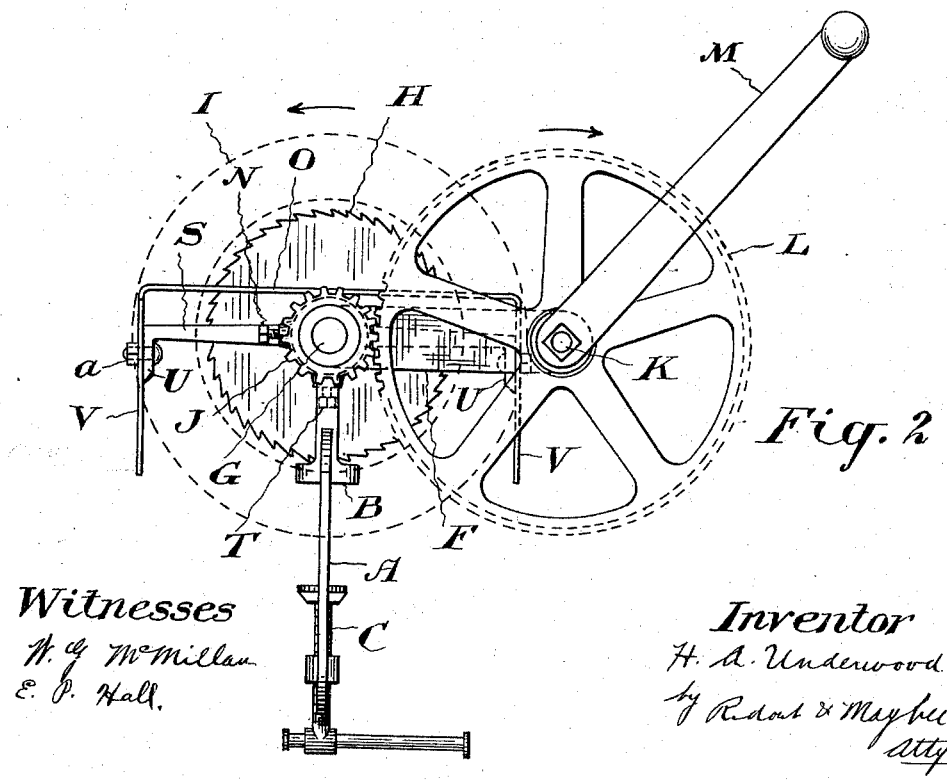

Figure 1 is a side elevation of a saw constructed in accordance with my invention. Fig. 2 is an end elevation of the same showing a slight modification of the table.

In the drawings like letters of reference indicate corresponding parts in the different figures.

A is the main frame which is provided with the jaw B through which is screwed the screw clamp C by means of which the saw may be clamped to the edge of a bench or table, as shown. This frame also has bearings D formed thereon in which is journaled the sleeve E which forms part of the gear frame F. In the sleeve is journaled the saw arbor G carrying the circular saw H. On the saw arbor is secured the fly wheel I and the gear pinion J. In the gear frame is journaled the spindle K and on this spindle is secured the gear wheel L meshing with the pinion J. To the shaft is also secured the crank handle M by means of which it may be rotated. The spindle K may be extended inwardly as shown and used if desired to operate feeding mechanism not shown. As the sleeve E is rotatable in the bearings D the gear frame F may be swung to bring the crank handle in any position convenient for the operator. The set screw N is screwed through the main frame and engages the sleeve E. This set screw provides means for holding the gear frame in any position to which it may be moved. The saw table O is preferably supported as follows. A table frame S is sleeved on the gear frame and may be clamped by means of a set screw T. Lugs U are formed at the sides of the frame S and against them bear the depending legs V of the table. Bolts *a* passing through holes in the lugs U and slots in the legs V serve to clamp the table at any desired elevation.

It will be understood of course that wherever I refer to set screws or clamping bolts the usual mechanical equivalents may be substituted.

From the above description it will be seen that I have devised a very simple and convenient hand circular saw which will satisfactorily attain the objects of my invention as set out in the preamble to this specification.

What I claim as my invention is:—

1. In a hand circular saw the combination of a main frame; means for securing the frame to a bench; a sleeve journaled in said frame; means for clamping said sleeve; a saw arbor journaled in the sleeve; a gear frame connected to the sleeve; a pinion fast on the saw arbor; a gear wheel journaled on the gear frame meshing with the aforesaid pinion; and means for driving the gear wheel.

2. In a hand circular saw the combination of a main frame; means for securing the frame to a bench; a sleeve journaled in said frame; means for clamping said sleeve; a saw arbor journaled in the sleeve; a gear frame connected to the sleeve; a pinion fast on the saw arbor; a gear wheel journaled on the gear frame meshing with the aforesaid pinion; means for driving the gear wheel; and a saw table vertically adjustable on the gear frame.

3. In a hand circular saw the combination of a main frame; means for securing the frame to a bench; a sleeve journaled on said frame; means for clamping said sleeve; a saw arbor journaled in the sleeve; a gear frame connected to the sleeve; a pinion fast on the saw arbor; a fly wheel fast on the saw arbor; a spindle journaled in the gear frame; a gear wheel fast on said spindle and meshing with the aforesaid pinion; and a crank handle fast on the spindle.

4. In a hand circular saw the combination of a main frame; means for securing the frame to a bench; a sleeve journaled in said frame; means for clamping said sleeve; a saw arbor journaled on the sleeve; a gear frame connected to the sleeve; a pinion fast on the saw arbor; a fly wheel fast on the saw arbor; a spindle journaled in the gear frame; a gear wheel fast on said spindle and meshing with the aforesaid pinion; a crank handle fast on the spindle; and a saw table vertically adjustable on the gear frame.

5. In a hand circular saw the combination of a main frame; means for securing the frame to a bench; a sleeve journaled in said frame; means for clamping said sleeve; a saw arbor journaled in the sleeve; a gear frame connected to the sleeve; a pinion fast on the saw arbor; a gear wheel journaled on the gear frame meshing with the aforesaid pinion; means for driving the gear wheel; and a saw table vertically and rotatably adjustable on the gear frame.

Stettler this 23d day of April 1910.

HENRY ARTHUR UNDERWOOD.

Witnesses:
HERBERT ALEXANDRIA BLAIR,
DANIEL L. McPHEE.